(12) United States Patent
Ryu et al.

(10) Patent No.: US 9,961,375 B2
(45) Date of Patent: May 1, 2018

(54) METHOD OF REMOVING COMMON MODE NOISE, AVN SYSTEM USING THE METHOD, AND VEHICLE INCLUDING THE AVN SYSTEM

(71) Applicant: Hyundai Motor Company, Seoul (KR)

(72) Inventors: Kwang Woo Ryu, Incheon (KR); Jang Soon Han, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/183,207

(22) Filed: Jun. 15, 2016

(65) Prior Publication Data

US 2017/0171573 A1    Jun. 15, 2017

(30) Foreign Application Priority Data

Dec. 9, 2015 (KR) .................. 10-2015-0175052

(51) Int. Cl.
| | | |
|---|---|---|
| *H03B 29/00* | (2006.01) | |
| *H04N 21/233* | (2011.01) | |
| *H01Q 1/48* | (2006.01) | |
| *H04N 21/414* | (2011.01) | |
| *H04N 21/485* | (2011.01) | |

(52) U.S. Cl.
CPC ............ *H04N 21/233* (2013.01); *H01Q 1/48* (2013.01); *H04N 21/41422* (2013.01); *H04N 21/4852* (2013.01)

(58) Field of Classification Search
CPC .. H01Q 1/48; H04N 21/233; H04N 21/41422; H04N 21/4852; H04R 2225/49; H04R 1/1083

USPC ..... 381/2, 3, 4, 13, 15, 86, 94.1, 94.5, 94.6, 381/104, 94.8; 324/750.26, 750.27; 361/818; 702/191; 29/25.41
See application file for complete search history.

(56) References Cited

U.S. PATENT DOCUMENTS

| | | | |
|---|---|---|---|
| 6,121,934 A | 9/2000 | Taniguchi et al. | |
| 8,354,975 B2 * | 1/2013 | Ando | H01Q 9/0421 333/202 |
| 2008/0051918 A1 * | 2/2008 | Tuttle | H04B 1/034 700/94 |
| 2011/0094075 A1 * | 4/2011 | Lee | B60L 11/1805 29/25.41 |
| 2012/0183102 A1 * | 7/2012 | Willingham | G01S 3/72 375/340 |
| 2015/0263694 A1 * | 9/2015 | Sun | B60L 11/1816 320/109 |

(Continued)

FOREIGN PATENT DOCUMENTS

| | | |
|---|---|---|
| CN | 2754278 Y | 1/2006 |
| JP | 05-206884 | 8/1993 |

(Continued)

*Primary Examiner* — Vivian Chin
*Assistant Examiner* — Friedrich W Fahnert
(74) *Attorney, Agent, or Firm* — Mintz Levin Cohn Ferris Glovsky and Popeo, P.C.; Peter F. Corless (57) ABSTRACT

A method of removing common mode noise in a vehicle includes: a radio frequency (RF) switch connecting a feeder cable ground to a common mode (CM) filter or a digital signal processor (DSP) according to a selection signal of an amplitude modulation (AM) broadcast or a frequency modulation (FM) broadcast selected by a user and the CM filter increasing impedance of the feeder cable ground to remove the common mode noise.

11 Claims, 4 Drawing Sheets

(56) References Cited

U.S. PATENT DOCUMENTS

2016/0285360 A1* 9/2016 Elshaer ................ H03H 7/0115
2016/0301300 A1* 10/2016 Elshaer .................. H02M 1/44

FOREIGN PATENT DOCUMENTS

| | | |
|---|---|---|
| JP | 2005-348317 A | 12/2005 |
| JP | 2006-177973 A | 7/2006 |
| JP | 2013/172197 A | 9/2013 |
| KR | 2002-0037503 A | 5/2002 |
| KR | 2006-0017716 A | 2/2006 |
| KR | 2008-0072584 A | 8/2008 |

* cited by examiner

METHOD OF REMOVING COMMON MODE NOISE, AVN SYSTEM USING THE METHOD, AND VEHICLE INCLUDING THE AVN SYSTEM

CROSS-REFERENCE TO RELATED APPLICATION

This application claims the benefit of and priority to Korean Patent Application No. 10-2015-0175052, filed on Dec. 9, 2015, which is hereby incorporated by reference in its entirety as if fully set forth herein.

BACKGROUND OF THE DISCLOSURE

Technical Field

The present disclosure relates generally to a method of removing common mode noise, an audio-video-navigation (AVN) system using the method, and a vehicle including the AVN system, and more particularly, to a method of removing common mode noise introduced into an AVN system through a feeder cable connected to a broadcast receiving antenna, thereby improving broadcast reception quality.

Discussion of the Related Art

In general, an audio-video-navigation (AVN) system for vehicles is a system in which audio equipment (such as a radio, a compact disk player, a tape player, an MP3 player, etc.), video multimedia equipment (such as a digital versatile disk (DVD) player, etc.), and navigation equipment are incorporated into a single system. The AVN system may also receive a digital multimedia broadcast (DMB).

The AVN system can be mounted in a vehicle. The demand for video and audio in vehicles has been increasing considerably as of late. In addition, there is demand for a small-sized, high-performance AVN system that is capable of providing high video quality and audio quality even in an abnormal weather conditions, such as vibration of a vehicle during travel of the vehicle and bad weather in a region in which the vehicle is traveling.

In a typical AVN system, a radio broadcast signal is received through a feeder cable connected to a broadcast receiving antenna, and the received signal is transmitted to the input end of a radio tuner to listen to a radio broadcast. However, in a case in which the radio broadcast signal is received as described above, signal loss occurs due to the use of the feeder cable, whereby reception performance is reduced.

SUMMARY OF THE DISCLOSURE

Accordingly, the present disclosure is directed to a method of removing common mode noise, an audio-video-navigation (AVN) system using the method, and a vehicle including the AVN system that substantially obviate one or more problems due to limitations and disadvantages of the related art.

An object of the present disclosure is to provide a method of removing common mode noise introduced through a feeder cable connected to a broadcast receiving antenna, thereby improving broadcast reception quality, an audio video navigation (AVN) system using the method, and a vehicle including the AVN system.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In accordance with embodiments of the present disclosure, a method of removing common mode noise in a vehicle includes: a radio frequency (RF) switch connecting a feeder cable ground to a common mode (CM) filter or a digital signal processor (DSP) according to a selection signal of an amplitude modulation (AM) broadcast or a frequency modulation (FM) broadcast selected by a user; and the CM filter increasing impedance of the feeder cable ground to remove the common mode noise.

Furthermore, according to embodiments of the present disclosure, an AVN system of a vehicle includes: an RF switch configured to connect a feeder cable ground to a CM filter or a DSP according to a selection signal of an AM broadcast or an FM broadcast selected by a user; and the CM filter which is configured to increase impedance of the feeder cable ground to remove common mode noise.

Furthermore, according to embodiments of the present disclosure, a vehicle has the AVN system described above installed therein.

It is to be understood that both the foregoing general description and the following detailed description of the present disclosure are exemplary and explanatory and are merely intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Reference will now be made in detail to the embodiments of the present disclosure, examples of which are illustrated in the accompanying drawings. As those skilled in the art would realize, the described embodiments may be modified in various different ways, all without departing from the spirit or scope of the present disclosure. The suffixes "module" and "unit" of elements herein are used for convenience of description and thus can be used interchangeably, and do not have any distinguishable meanings or functions.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Figure 1:
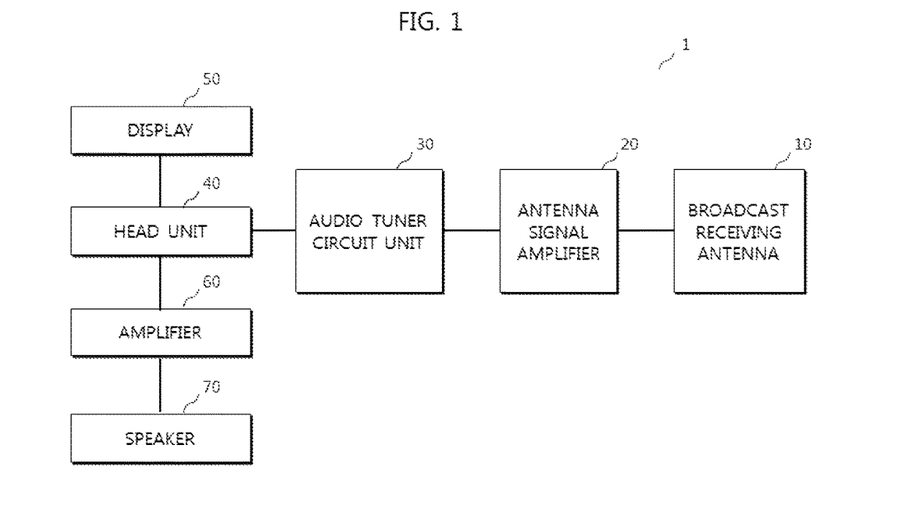
FIG. 1 is a block diagram showing an audio video navigation (AVN) system according to embodiments of the present disclosure.

Referring now to the presently disclosed embodiments, FIG. 1 is a block diagram showing an audio-video-navigation (AVN) system according to embodiments of the present disclosure.

As shown in FIG. 1, an AVN system 1 may be installed in a vehicle to control hardware, such as a display, a touchscreen, a speaker, etc., and to execute a music, video, or navigation program, according to a driver's request. In addition, the AVN system 1 may control a vehicle controller (not shown) to perform a charging or air conditioning operation according to an external remote control request.

The AVN system 1 may include a broadcast receiving antenna 10, an antenna signal amplifier 20, an audio tuner circuit unit 30, a head unit 40, a display 50, an amplifier 60, and a speaker 70.

The broadcast receiving antenna 10 may receive an amplitude modulation (AM) radio signal, a frequency modulation (FM) radio signal, a digital multimedia broadcast (DMB) signal, a transport protocol expert group (TPEG) signal, and the like. A shark pin antenna, which is installed on the roof of the vehicle, a glass antenna, which is installed on the back windshield of the vehicle, or a diversity antenna, which includes both the shark pin antenna and the glass antenna, or the like, may be used as the broadcast receiving antenna 10.

An antenna for vehicles receives a radio wave while the vehicle is moving; problematically, a fading phenomenon can occur. The fading phenomenon involves a phenomenon in which the intensity of a received radio wave is changed depending on a medium through which the vehicle moves due to the characteristics of the moving vehicle. In order to remove such a fading phenomenon, the diversity antenna includes two receiving antennas, by which two radio wave channels are formed, thereby reducing a ghost phenomenon due to the fading phenomenon.

The antenna signal amplifier 20 may separate a received signal into an AM radio signal, an FM radio signal, a DMB signal, and a TPEG signal. That is, a signal received by the broadcast receiving antenna 10 may be classified by the antenna signal amplifier 20.

In a case in which a received signal is a DMB signal or a TPEG signal, the signal is processed and transmitted to a DMB tuner (not shown). The supplied DMB signal or TPEG signal is processed by a central processing unit (CPU) and a digital signal processor (DSP) of the DMB tuner (not shown). An audio signal is amplified by the amplifier 60 and output through the speaker 70, under control of the head unit 40. A video signal is output through the display 50.

In a case in which a received signal is an AM radio signal or an FM radio signal, the antenna signal amplifier 20 may process the signal (e.g., amplify the signal and remove noise from the signal) and transmit the processed signal to the audio tuner circuit unit 30.

The antenna signal amplifier 20 is connected to the audio tuner circuit unit 30 via a feeder cable. The processed AM radio signal or FM radio signal is transmitted to the audio tuner circuit unit 30 via the feeder cable.

The audio tuner circuit unit 30 may extract desired broadcast data from the AM radio signal or FM radio signal based on a specific frequency selected by a user. To this end, the audio tuner circuit unit 30 may include a DSP 31 (e.g., see FIG. 3) and a CPU. In addition, the audio tuner circuit unit 30 may further include a ground controller 33 (e.g., see FIG. 3) configured to control a ground of the feeder cable. The operations of these components will be described hereinafter in detail with reference to FIGS. 2 and 3.

The head unit 40 performs control operations of the vehicle (e.g., air conditioning, media playback, etc.) and controls overall operations of electric devices in the vehicle. In particular, the head unit 40 may classify broadcast data received from the audio tuner circuit unit 30 and control video information to be output through the display 50 and audio information to be amplified by the amplifier 60 and to be output through the speaker 70.

In addition, the head unit 40 may receive a user's control command (e.g., an AM or FM selection command) input through a user interface and transmit a signal corresponding thereto (an AM/FM selection signal of FIG. 3) to the audio tuner circuit unit 30. Furthermore, the head unit 40 may receive a user's frequency selection and transmit a signal corresponding thereto to the audio tuner circuit unit 30.

The display 50 outputs the video information received from the head unit 40. A liquid crystal display (LCD), for instance, may be used as the display 50, though the display 50 is not limited thereto.

The amplifier 60 may amplify the audio information received from the head unit 40 such that the audio information has a predetermined gain, and the speaker 70 may output the amplified audio information.

Figure 2:
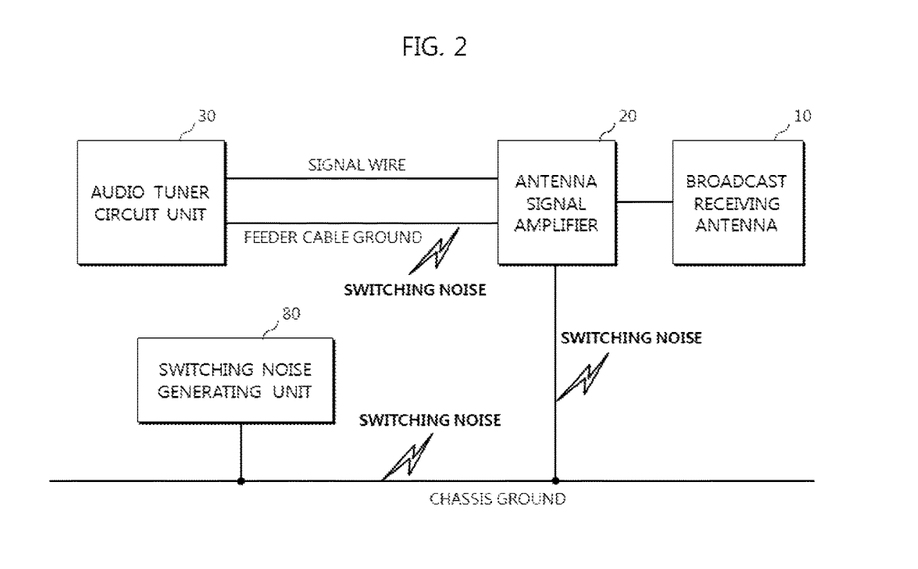
FIG. 2 is a block diagram illustrating switching noise generated in the AVN system shown in FIG. 1.

FIG. 2 is a block diagram illustrating switching noise generated in the AVN system shown in FIG. 1.

As shown in FIG. 2, the antenna signal amplifier 20 shares a chassis ground with a switching noise generating unit 80, which is another electric device in the vehicle. The switching noise generating unit 80 is an electric device including a high-power, high-current switching circuit. For example, the switching noise generating unit 80 may be a motor driven power steering (MDPS), a cooling fan, or a fuel pump. The high-power, high-current switching circuit of the switching noise generating unit 80 generates a considerable amount of switching noise. In particular, the switching noise is concentrated on a portion (520 to 1200 kHz) of the AM broadcast band (526.5 to 1606.5 kHz).

The switching noise may be transmitted in the form of direct radiation through the broadcast receiving antenna 10. The switching noise transmitted in the form of direct radiation may be removed by simple filter tuning of the corresponding electric device. For this reason, the switching noise transmitted in the form of direct radiation is insignificant.

However, switching noise transmitted through the chassis ground is common mode noise, which can greatly affect the audio tuner circuit unit 30. The antenna signal amplifier 20 and the audio tuner circuit unit 30 are connected to each other via the feeder cable. A coaxial cable is used as the feeder cable.

The feeder cable may include a signal wire, an insulator (or a dielectric) surrounding the signal wire, and a shield, which is a conductor surrounding the insulator. The feeder cable may have impedance that is capable of minimizing the distortion in waveform of a radio frequency (RF) signal (e.g., an impedance of approximately 75Ω). The signal wire corresponds to a signal wire shown in FIG. 2, and the shield corresponds to a feeder cable ground shown in FIG. 2.

The feeder cable ground is connected to the chassis ground. The antenna signal amplifier 20, which shares the chassis ground with the switching noise generating unit 80, transmits the switching noise to the audio tuner circuit unit 30 via the feeder cable ground.

Figure 3:
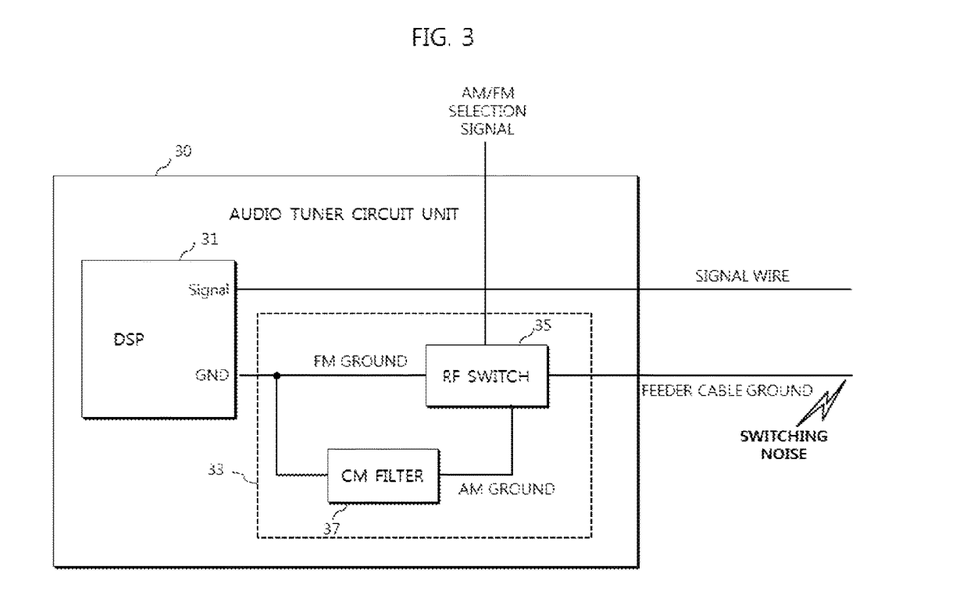
FIG. 3 is a block diagram showing in more detail an audio tuner circuit unit shown in FIG. 2.

FIG. 3 is a block diagram showing in more detail the audio tuner circuit unit shown in FIG. 2.

As shown in FIG. 3, the audio tuner circuit unit 30 may include a DSP 31 and a ground controller 33. The audio tuner circuit unit 30 may include another component (e.g., a CPU) configured to process an AM radio signal and an FM radio signal. However, FIG. 3 schematically shows only components that are necessary to describe the present disclosure.

The DSP 31 processes an AM radio signal and an FM radio signal transmitted to an input signal terminal, which is denoted by Signal, through the signal wire. The ground controller 33 may be connected between the feeder cable ground and a ground terminal, which is denoted by GND, of the DSP 31.

In a case in which the feeder cable ground is directly connected to the ground terminal of the DSP 31, switching noise (or common mode noise) transmitted to the feeder cable ground fluctuates the ground of the DSP 31, with the result that an AM radio signal and an FM radio signal may be distorted.

In order to minimize the effect of switching noise transmitted to the feeder cable ground, the ground controller 33 is connected between the feeder cable ground and the ground terminal GND of the DSP 31. The ground controller 33 may include an RF switch 35 and a common mode (CM) filter 37.

The RF switch 35 performs a switching function of connecting the feeder cable ground to an AM ground or an FM ground according to the AM/FM selection signal received from the head unit 40. The AM/FM selection signal may be a signal indicating one selected from between an AM broadcast and an FM broadcast by a user.

Specifically, in a case in which the AM/FM selection signal indicates that the user has selected the AM broadcast, the RF switch 35 may connect the feeder cable ground to the AM ground. Consequently, the feeder cable ground may be connected to the ground terminal GND of the DSP 31 via the CM filter 37.

The CM filter 37 may increase the impedance of the feeder cable ground to remove common mode noise introduced through the feeder cable ground. Consequently, the common mode noise introduced into the ground terminal GND of the DSP 31 is blocked.

On the other hand, if the AM/FM selection signal indicates that the user has selected the FM broadcast, the RF switch 35 may connect the feeder cable ground to the FM ground. Consequently, the feeder cable ground may be directly connected to the ground terminal GND of the DSP 31.

That is, common mode noise is not removed by the CM filter 37. If the impedance of the feeder cable ground deviates from a specific value (e.g., 75Ω) at which signal distortion is minimized, however, the signal distortion of an FM radio signal, which is a high-frequency signal, may be serious. In order to minimize signal distortion of the FM radio signal, the RF switch 35 connects the feeder cable ground to the FM ground.

Upon receiving an AM radio signal, which contains common mode noise, therefore, the RF switch 35 connects the feeder cable ground to the ground terminal GND of the DSP 31 via the CM filter 37. As a result, the common mode noise is removed, thereby minimizing the signal distortion of the AM radio signal. Upon receiving an FM radio signal, which does not contain common mode noise, on the other hand, the RF switch 35 directly connects the feeder cable ground to the ground terminal GND of the DSP 31. As a result, impedance mismatching is prevented, thereby minimizing the signal distortion of the FM radio signal.

That is, in the AVN system 1 according to embodiments of the present disclosure, the ground path connected to the tuner is changed based on the characteristics of the AM or FM broadcast signal in order to remove the common mode noise or to adaptably perform impedance matching, thereby minimizing the signal distortion of the AM or FM broadcast signal.

In addition, it is possible for the audio tuner circuit unit 30 to remove common mode noise at once without installing modules that remove common mode noise with respect to a plurality of switching noise generating units in order to remove the common mode noise introduced into the audio tuner circuit unit 30, thereby reducing cost related to the modules.

Figure 4:
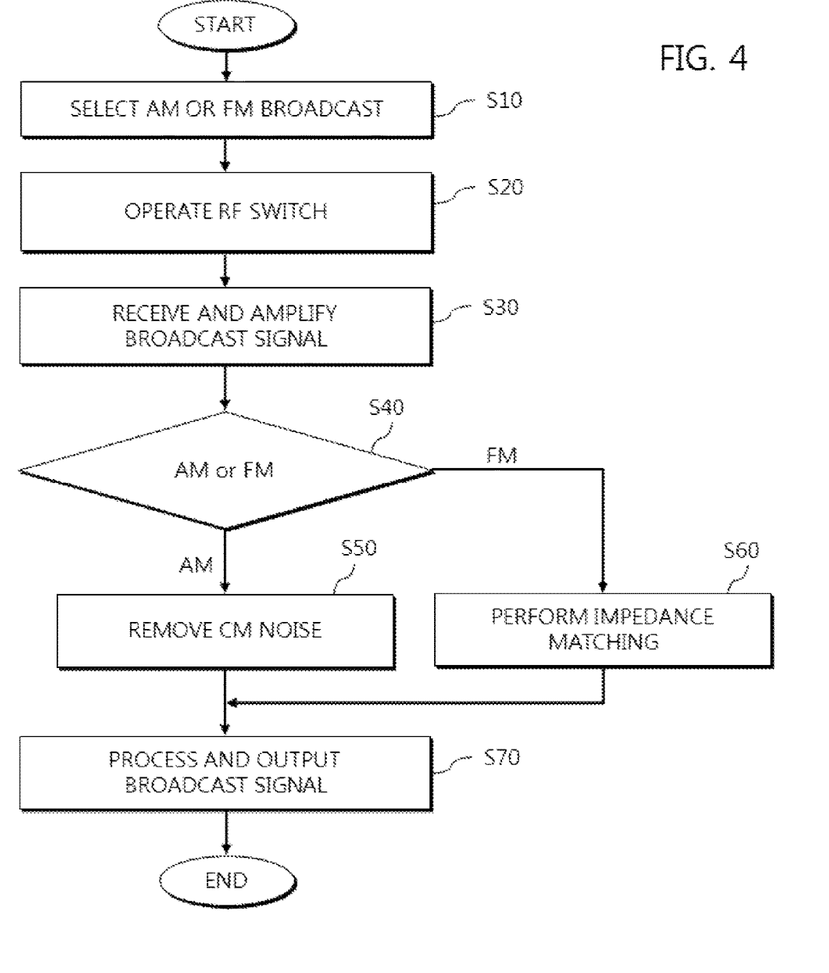
FIG. 4 is a flowchart showing a method of removing common mode noise according to embodiments of the present disclosure.

FIG. 4 is a flowchart showing a method of removing common mode noise according to embodiments of the present disclosure.

As shown in FIG. 4, an AM broadcast or an FM broadcast is selected by a user during the operation of the AVN system 1, and an AM/FM selection signal corresponding thereto is transmitted to the audio tuner circuit unit 30 (S10).

The RF switch 35 performs a switching function of connecting the feeder cable ground to the AM ground or the FM ground according to the AM/FM selection signal (S20).

The broadcast receiving antenna 10 receives an AM broadcast signal and an FM broadcast signal, and the antenna signal amplifier 20 amplifies the received signals and transmits the amplified signals to the audio tuner circuit unit 30 via the feeder cable (S30).

In a case in which the AM/FM selection signal indicates that the user has selected the AM broadcast (AM path of S40), the feeder cable ground may be connected the AM ground and thus connected to the ground terminal GND of the DSP 31 via the CM filter 37.

The CM filter 37 may increase the impedance of the feeder cable ground to remove common mode noise introduced through the feeder cable ground. Consequently, the common mode noise introduced into the ground terminal GND of the DSP 31 is blocked (S50).

On the other hand, in a case in which the AM/FM selection signal indicates that the user has selected the FM broadcast (FM path of S40), the feeder cable ground may be connected the FM ground and thus directly connected to the ground terminal GND of the DSP 31.

The RF switch 35 connects the feeder cable ground to the FM ground such that the impedance of the feeder cable ground is maintained at a specific value (e.g., 75Ω) (for impedance matching, as an example) in order to minimize the signal distortion of an FM radio signal, which is a high-frequency signal (S60).

The audio tuner circuit unit 30 may extract desired broadcast data from the AM radio signal or FM radio signal based on a specific frequency selected by the user, and the head unit 40 may output the AM broadcast or the FM broadcast through the amplifier 60 and the speaker 70 (S70).

Figure 5:
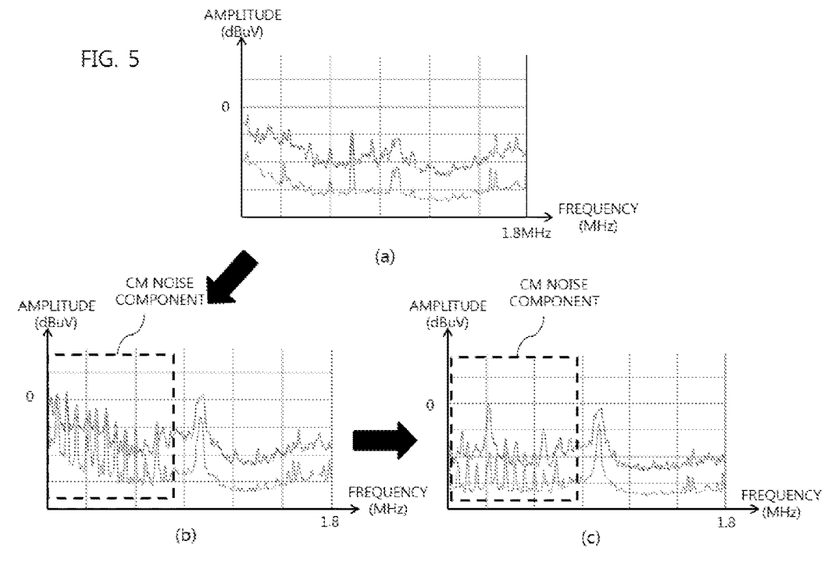
FIG. 5 is a view illustrating the operation of the audio tuner circuit unit shown in FIG. 3.

FIG. 5 is a view illustrating the operation of the audio tuner circuit unit shown in FIG. 3.

Part (a) of FIG. 5 is a graph showing the amplitudes of a radio signal within a predetermined frequency band in a case in which the switching noise generating unit 80 is not connected to the chassis ground.

The measurement results shown in FIG. 5 are obtained when the switching noise generating unit 80 is an MDPS.

The X-axis indicates frequencies. Each graduation indicates 0.2 MHz. Consequently, FIG. 5 shows a frequency of about 520 KHz to about 1.8 MHz.

The Y-axis indicates amplitudes. Each graduation indicates 10 dBuV. Consequently, FIG. 5 shows an amplitude of about −40 dBuV to about +15 dBuV.

In part (a) to part (c) of FIG. 5, each measurement result has two waveforms. The upper waveform shows the peak value of amplitudes corresponding to specific frequencies, and the lower waveform shows the average value of amplitudes corresponding to specific frequencies.

Part (b) of FIG. 5 is a graph showing the amplitudes of a radio signal within a predetermined frequency band in a case in which the switching noise generating unit 80 is connected to the chassis ground, and the ground controller 33 is not provided.

As the switching noise generating unit 80 is connected to the chassis ground, switching noise is generated, and a common mode noise component thereof is concentrated on a portion (520 to 1200 kHz) of the AM broadcast band (526.5 to 1606.5 kHz). As a result, amplitudes different from those of the original radio signal are generated within the AM broadcast band (520 to 1200 kHz).

Part (c) of FIG. 5 is a graph showing the amplitudes of a radio signal within a predetermined frequency band in a case in which the switching noise generating unit 80 is connected to the chassis ground, and the ground controller 33 is provided.

As the ground controller 33 is connected to the feeder cable ground, an AM radio signal is received through the CM filter 378. Consequently, common mode noise is removed (reduced by 30 dBuV at the maximum) due to the increase in impedance of the feeder cable ground, thereby minimizing the signal distortion of the AM radio signal.

The method of removing common mode noise may be realized as code, which is readable by a computer, in recording media readable by the computer. The recording media readable by the computer include all kinds of recording media to store data which are readable by the computer. Examples of the recording media readable by the computer may include a read only memory (ROM), a random access memory (RAM), a magnetic tape, a magnetic disk, a flash memory, and an optical data storage device. In addition, the recording media readable by the computer may be distributed to computer systems connected to each other through a network such that code readable by the computer is stored or executed in a distributed manner.

As is apparent from the above description, in the AVN system according to the present disclosure, the ground path connected to the tuner is changed based on the characteristics of the AM or FM broadcast signal in order to remove common mode noise or to adaptably perform impedance matching, thereby minimizing the signal distortion of the AM or FM broadcast signal.

In addition, it is possible for the audio tuner circuit unit to remove common mode noise at once without installing modules that remove common mode noise with respect to a plurality of switching noise generating units in order to remove the common mode noise introduced into the audio tuner circuit unit, thereby reducing cost related to the modules.

It will be appreciated by persons skilled in the art that that the effects that can be achieved through the present disclosure are not limited to what has been particularly described hereinabove and other advantages of the present disclosure will be more clearly understood from the above detailed description.

It will be apparent to those skilled in the art that various modifications and variations can be made in the present disclosure without departing from the spirit or scope of the disclosure. Thus, it is intended that the present disclosure covers the modifications and variations of the disclosed embodiments provided they come within the scope of the appended claims and their equivalents.

What is claimed is:

1. A method of removing common mode noise in a vehicle, the method comprising:
   connecting, by a radio frequency (RF) switch, a feeder cable around to a common mode (CM) filter or a digital signal processor (DSP) according to a selection signal of an amplitude modulation (AM) broadcast or a frequency modulation (FM) broadcast selected by a user;
   increasing, by the CM filter, impedance of the feeder cable ground to a specific value at which the common mode noise is removed: and
   maintaining the impedance of the feeder cable ground at said specific value when the feeder cable ground is connected to the DSP,
   wherein the connecting of the feeder cable ground comprises connecting, the RF switch, the feeder cable ground to the DSP when the selection signal indicates that the FM broadcast has been selected.

2. The method according to claim 1, wherein the connecting of the feeder cable ground comprises connecting, by the RF switch, the feeder cable ground to the CM filter when the selection signal indicates that the AM broadcast has been selected.

3. The method according to claim 1, wherein the specific value is approximately 75 Ω.

4. The method according to claim 1, wherein the common mode noise is switching noise generated due to switching between electric devices in the vehicle.

5. The method according to claim 1, wherein the common mode noise is introduced through a chassis ground in the vehicle.

6. An audio-video-navigation (AVN) system of a vehicle comprising:

an RF switch configured to connect a feeder cable ground to a CM filter or a DSP according to a selection signal of an AM broadcast or an FM broadcast selected by a user; and the CM filter which is configured to increase impedance of the feeder cable ground to a specific value at which the common mode noise is removed, wherein the RF switch is further configured to connect the feeder cable ground to the DSP when the selection signal indicates that the FM broadcast has been selected, and the impedance of the feeder cable ground is maintained at said specific value when the feeder cable ground is connected to the DSP.

7. The AVN system according to claim 6, wherein the RF switch is further configured to connect the feeder cable ground to the CM filter when the selection signal indicates that the AM broadcast has been selected.

8. The AVN system according to claim 6, wherein the specific value is approximately 75 Ω.

9. The AVN system according to claim 6, wherein the common mode noise is switching noise generated due to switching between electric devices in the vehicle.

10. The AVN system according to claim 6, wherein the common mode noise is introduced through a chassis ground in the vehicle.

11. A vehicle comprising:

an audio-video-navigation (AVN) system including: an RF switch configured to connect a feeder cable ground to a CM filter or a DSP according to a selection signal of an AM broadcast or an FM broadcast selected by a user, and the CM filter which is configured to increase impedance of the feeder cable ground to a specific value at which the common mode noise is removed; and a switching noise generating unit configured to share a chassis ground with the AVN system, wherein the RF switch is further configured to connect the feeder cable around to the DSP when the selection signal indicates that the FM broadcast has been selected, and the impedance of the feeder cable ground is maintained at said specific value when the feeder cable ground is connected to the DSP.

\* \* \* \* \*